Sept. 29, 1953     G. E. LYNCH     2,653,675
GAS CLEANING APPARATUS

Filed Jan. 20, 1950     2 Sheets-Sheet 1

INVENTOR.
GEORGE E. LYNCH
BY

ATTORNEY

Sept. 29, 1953      G. E. LYNCH      2,653,675
GAS CLEANING APPARATUS
Filed Jan. 20, 1950      2 Sheets-Sheet 2
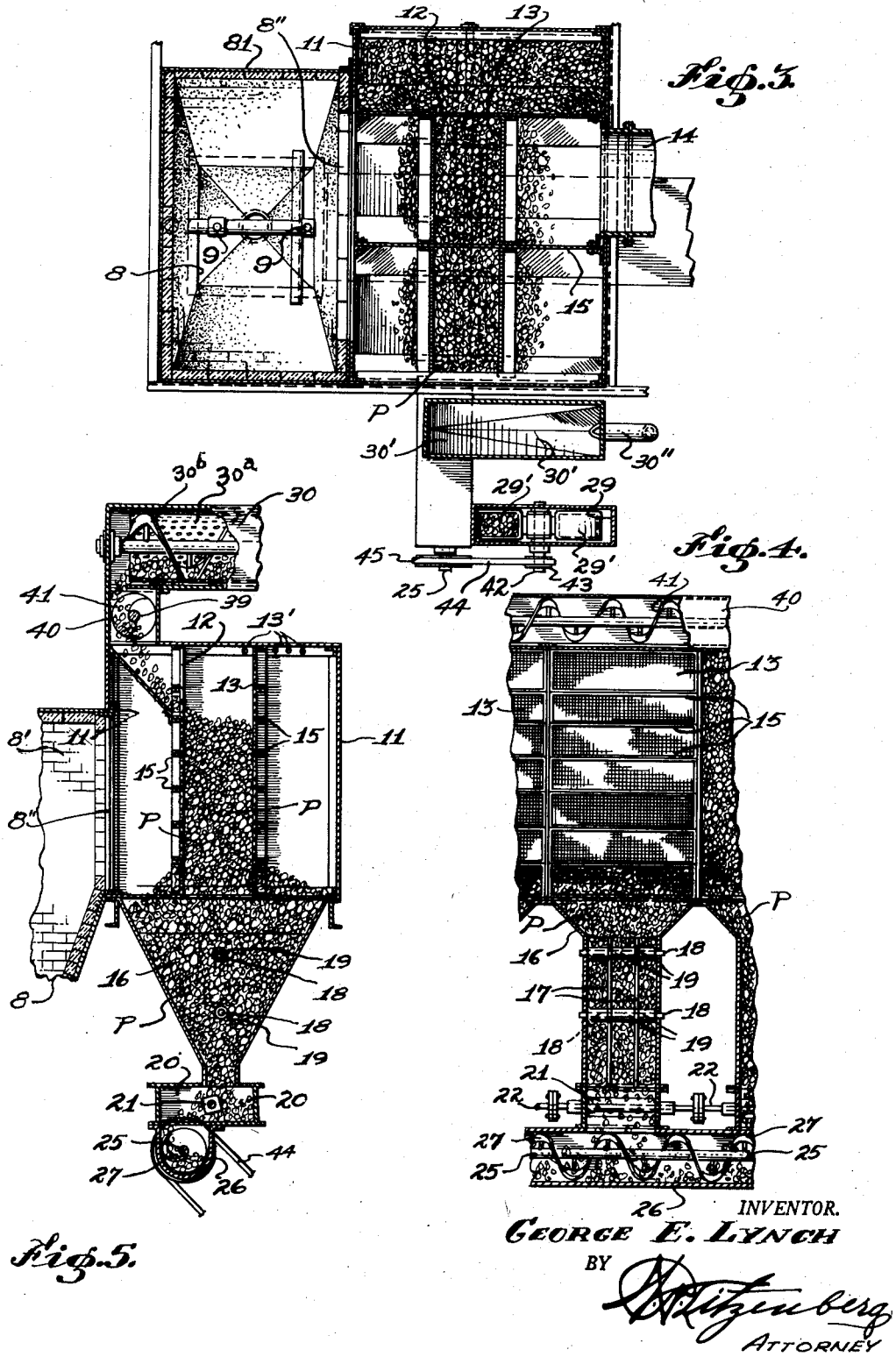
INVENTOR.
GEORGE E. LYNCH
BY
ATTORNEY Patented Sept. 29, 1953

2,653,675

UNITED STATES PATENT OFFICE 2,653,675

GAS CLEANING APPARATUS

George E. Lynch, Los Angeles, Calif.

Application January 20, 1950, Serial No. 139,686

1 Claim. (Cl. 183—9)

This invention relates to gas cleaning apparatus, and more particularly to certain improvements in apparatus for cleaning gases, and especially hot gases such as are discharged from metallurgical and other furnaces at high temperatures, and carry finely divided inert solid particles as well as volatilized metals and compounds, and condensible gases, which impurities appear as solids or as liquid droplets upon cooling. These impurities must be separated from the gases as completely as possible before said gases are discharged into the atmosphere, in order to comply with laws being enacted for the purpose of controlling air pollution.

I have discovered that if said gases are precooled under controlled conditions, using extremely fine water sprays for final cooling to approximately the temperature at which water boils, and are caused to pass through the interstitial spaces of a body of screened pebbles, such as sized crushed rock, or artificial nodules, the temperature of said body being slightly less than that of the gases, a part of the contained water which exists as superheated steam in the gases can be caused to condense and to form a thin film of water upon the surface of those pebbles which are in contact with the gas current. This film is most efficient in collecting fine dust, sublimated volatiles, and condensed gases which are carried by the gas current.

In order that this separation may be accomplished successfully, two essential features must be provided:

1. The cooling of the gases must be controlled so that only a part of the contained water is condensed, enough to form a thin film on the pebbles, as excess water causes clogging and closing of the passages through the pebble bed and reduces the efficiency. Only the sensible heat of the gas above the boiling point of water is dissipated, the latent heat of vaporization of the contained water being left in the gas. Upon entering the cooler pebble bed, that part of the hot gas which is directly in contact with the pebbles is cooled to the condensation point, the balance of it passing through the pebble bed and emerging at the other side at about the same temperature as that at which it entered.

2. The pebble body must be provided with a circulating system which is capable of maintaining a more or less uniform movement of the entire mass when said mass is composed of sticky and wet pebbles and mud. This is absolutely necessary to successful operation and in order to avoid extensive clogging of parts of the pebble body and to prevent setting or hardening of such materials as have that tendency when wet.

The problem of uniform movement of wet and sticky materials in bins and chutes is one that has baffled the efforts of many skilled mill operators, and the clogging and sticking of mass has finally been accepted as incurable and the bins and chutes are simply emptied and cleaned when conditions interfere too much with operations.

I have by study of conditions and careful tests discovered a form of hopper and feeder which handles wet and sticky materials successfully, and this is made the subject matter of the present application for patent.

In the accompanying two sheets of drawings, I have shown one practical embodiment of the invention, which I will now describe:

In the drawings, Figure 1 is an end elevation of an apparatus embodying my invention, with a part broken out and in section;

Figure 3 is a plan view looking down into the apparatus at the horizontal section line 3—3, on Fig. 1;

Figure 4 is a vertical sectional view taken on the irregular section line 4—4 on Fig. 1; and Figure 5 is a vertical sectional view taken on the line 5—5, on Fig. 2.

Figure 1:
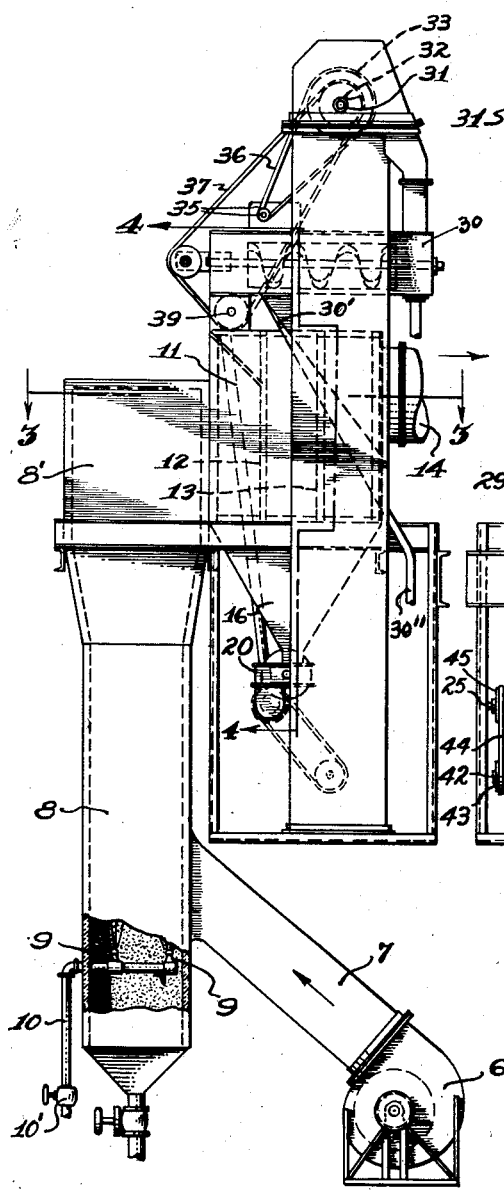
Figure 2:
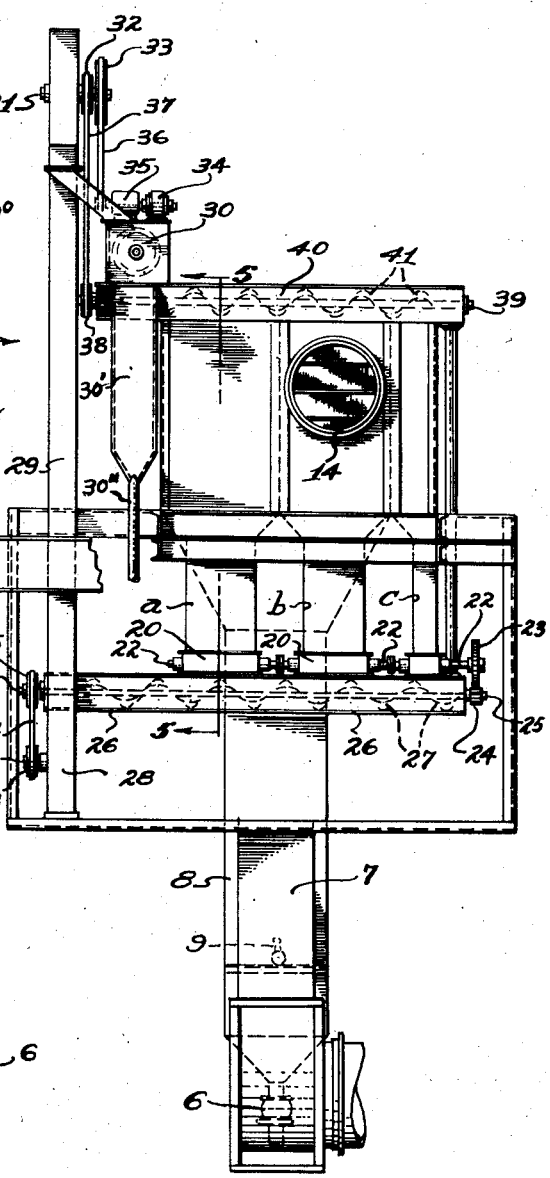
Figure 2 is a side elevation thereof, as seen from the right hand side of Fig. 1.
Figure 2:

Referring now in detail to the drawings, the embodiment of my invention here shown for illustrative and descriptive purposes includes a power-fan, designated 6, for drawing gases from a furnace, after they have been passed through any of the usual means for cooling, such as waste heat boilers, etc., said fan delivering said gases through a duct or chute 7 and into a vertical shaft 8, as indicated in Figs. 1 and 2. Said vertical shaft 8 is provided therein with a plurality of high pressure spray nozzles, as 9, 9, connected with a pipe 10, for supplying water in a spray under pressure into said vertical shaft 8, in the manner clearly illustrated in Fig. 1. These extremely fine water sprays are discharged from the nozzles 9, 9, with a control valve, as 10' therefor, whereby the volume and consequently the cooling action thereof, can be varied at will. The gases pass upwardly through a cloud of spray in said shaft 8 to the upper chamber 8' thereof, and thence laterally through an opening 8" into a cleaner housing, designated as a whole by 11, having two vertical partitions, as 12 and 13, of open or reticulated material therein, whereby to confine pebble-like material, designated P, in the middle section or bin, Fig. 5. Partition 13 may be adjusted, as indicated at 13', where holes therefor are shown. This is to increase the thickness of the body of pebbles, as may be desired for the best results.

An outlet from said housing and said body of pebbles is designated 14, and is seen in Figs. 1, 2 and 3. Cross members or partitions, as 15, 15, are provided in said housing 11, for supporting and strengthening the partitions 13 and 14, as may be desired, and as indicated in Figs. 3, 4 and 5.

The bottom of said housing 11 is in the form of a V-shaped hopper, designated 16, the lower part of which is provided with a plurality of vertical partitions, as 17, 17, with through bolts 18, 18, and spacers 19, 19, thereon and therebetween, as shown in Fig. 4. Said hopper 16, and its plural bins, terminate at their lower ends in feed boxes or chambers, as 20, 20, with revolving agitators in them, designated 21. These feed boxes and agitators extend across the lower ends of the discharge portions of said hopper, as shown in Figs. 2, 4 and 5.

At the top of said hopper structure 16, it is wide enough to underlie the housing 11, as seen in Fig. 5. At right angles, each hopper structure is divided into three different parallel feed passageways, as seen in Fig. 4, where only the middle one is shown fully, but in Fig. 2, said three reduced portions are designated a, b and c, and each has its separate feed box 20, with the three agitators 21, 21, 21, therein, connected to be driven from a common shaft 22, having a gear 23 on its outer end, in mesh with a pinion 24, on a shaft 25, extending through the feed trough 26, with a feed screw 27 thereon, within said feed trough, for feeding the pebbles discharged thereinto from the feed boxes 20, 20, along said feed trough 26, and into the lower end, or boot 28, of an elevator 29, which carries the pebbles up to a screen housing 30, with a revolving screen cleaner 30ª, with feed spiral 30ᵇ therein, and in which dust, and under-sized pebbles are separated and fall into a special chute 30', placed thereunder, and terminating in a pipe 30'', as seen in Figs. 1, 2 and 3.

At the upper end of said vertical elevator 29 is a shaft 31, on the end of which are two pulleys 32, 33. Mounted on the screen box 20, Fig. 2, is a motor 34, with a variable speed drive 35, with belt 36 therefrom to the pulley 33. This drives the shaft 31 and the conveyor buckets 29', in the vertical elevator 29. A belt 37 from pulley 32 extends down to a pulley 38, on the shaft 39 in the distributing conveyor trough 40, in which is the feed screw 41 for distributing the pebbles to the bins of the cleaner housing. At the lower end of said vertical elevator 29 is a shaft 42, with pulley 43 thereon, for the lower end of the endless bucket line 29', with a belt 44 from said pulley 43 up to another pulley 45 on shaft 25, as seen in Figs. 2 and 3, which drives the conveyor 27, and through the gears 23 and 24, at the opposite end of said shaft 25, drives the agitators, in the boxes 20, 20, before referred to.

Much of the mechanism shown and described is recognized to be old, and is shown and described in other patents of this applicant, especially the superstructure and arrangement for handling the pebbles, and while this is shown for better understanding of the invention of this application, it is to be understood that this invention is more generally set forth in the opening paragraphs of this specification, before reaching the detailed description of the drawings.

The invention may be briefly described as follows:

Assuming that the hot gases which are drawn in by the fan 6, and are discharged through the duct 7 at high temperature, these gases contain a certain number of B. t. u. of heat per pound of gas. When these hot gases encounter the fine atomized spray of water in turbulence, they give up a certain amount of their heat in changing this water from liquid form to that of steam. This addition of water to the gas is of such amount as to reduce the sensible heat of the gases to a point slightly above the boiling point of water. The pebbles, in operation, have been heated by the passage of the gases to a point slightly below the boiling point of water. The gases entering the pebble bed are slightly above the point of condensation, so that the gas remains dry. Upon impinging upon the surfaces of the bed of pebbles which are slightly cooler than the point of condensation (dewpoint), that part of the gas coming immediately in contact with the pebble surfaces, gives up a part of its water in the form of liquid which is deposited as a thin film upon the pebble surfaces throughout the entire mass of pebbles. The gases emerge from the pebble mass at about the same temperature at which they entered it.

I am aware that cooling of gases containing dust and water vapor below their dewpoint is practiced in certain washing apparatus in order to improve collection of the solids. In this case, both gas and solids are cooled to a point where the water condenses upon the fine solids in suspension, forming a fog. In my invention, both gas and solids remain at a temperature slightly above the dewpoint, and condensation takes place only when the dust laden gas comes in contact with the cooler surfaces of the pebbles in the apparatus. This results in the deposit of a thin and uniform film of moisture upon all pebbles in contact with the moving gas, this action continuing through the entire bed of pebbles, since the gases emerge from this bed at about the same temperature at which they entered it.

This uniform film cannot be obtained either by wetting the pebbles before they enter the active zone, or by spraying the mass ahead of the gases, since both of these methods tend to cause concentration of moisture in the voids and consequent clogging of the bed.

While I have shown sufficient apparatus to carry out my invention as I have described it, I am aware that changes in the details of construction and arrangement can be made within the scope of the invention, and I do not, therefore, limit the invention to these details, except as I may be limited by a reasonable interpretation of the claim hereto appended and made a part of this specification.

I claim:

The process of cleaning hot gases containing fine solids in suspension and water in the form of vapor, which consists in first reducing the temperature to slightly above the dewpoint, and then causing said cooled gases to move through a slowly moving body of sized pebbles which are at a temperature slightly below that of said gases, to cause a part of the water vapor carried thereby to be condensed and deposited on the surfaces of said pebbles in the form of a film, whereby it becomes a means of picking up and holding the fine solids and impurities from said gases as said gases are caused to pass through the interstitial spaces in said body of pebbles.

GEORGE E. LYNCH.

References Cited in the file of this patent

UNITED STATES PATENTS

| Number | Name | Date |
| --- | --- | --- |
| 1,672,778 | Raffloer | June 5, 1928 |
| 1,782,823 | Heckenbleikner | Nov. 25, 1930 |
| 1,797,256 | Boardman | Mar. 24, 1931 |
| 1,927,869 | Downs | Sept. 26, 1933 |
| 2,202,258 | Lynch | May 28, 1941 |

FOREIGN PATENTS

| Number | Country | Date |
| --- | --- | --- |
| 110,235 | Great Britain | Oct. 18, 1917 |
| 77,930 | Switzerland | Nov. 1, 1918 |
| 514,169 | Germany | Dec. 8, 1930 |